March 26, 1957  G. ARNOLD  2,786,428
COMBINATION CARGO TIE DOWN AND SEAT FITTING
Filed June 4, 1952
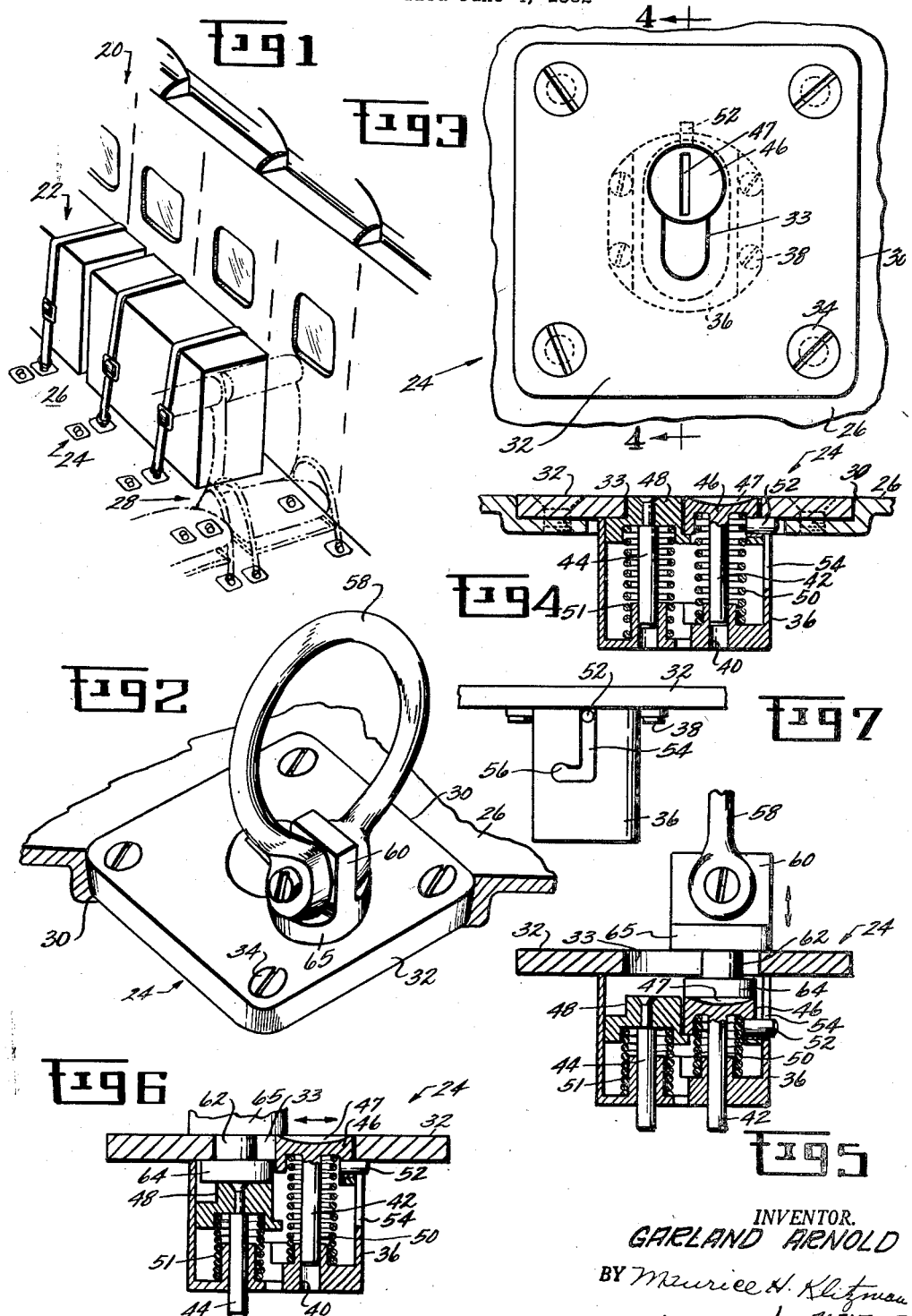
INVENTOR.
GARLAND ARNOLD
BY Maurice H. Klitman
Wade Koontz
AGENT—
ATTORNEY—

United States Patent Office 2,786,428
Patented Mar. 26, 1957

2,786,428

COMBINATION CARGO TIE DOWN AND SEAT FITTING

Garland Arnold, Fairborn, Ohio

Application June 4, 1952, Serial No. 291,819

7 Claims. (Cl. 105—369)

(Granted under Title 35, U. S. Code (1952), sec. 266)

The invention described herein may be manufactured and used by or for the Government for governmental purposes without payment to me of any royalty thereon.

This invention relates to a method of changing over from a cargo carrying airplane to a passenger carrying airplane and in particular in changing cargo tie down fittings for seat fittings or vice versa.

Aircraft must be versatile so as to utilize every inch of their capacity in order to carry the maximum pay load. Also, aircraft fly many times as a passenger plane without being completely filled and could take cargo if equipped to do so, and also cargo carrying planes often times fly without carrying their maximum capacity of cargo but not being able to carry passengers because of not having adequate equipment to carry them. Therefore, it is an object of this invention to convert portions of the plane to either cargo carrying or passenger carrying as the needs may require.

Aircraft that are generally used as passenger planes are used in carrying cargo in off hours and are generally not equipped to handle all types of cargo since the seats are generally not removable. Therefore, it is another object of this invention to provide a method of meeting the varying needs for changing over from passenger to cargo or vice versa as economical and efficiently as possible.

It is a further object of this invention to provide a fitting flush with the floor in the aircraft to prevent harm to cargo while the aircraft is being loaded, the said fitting being adapted to receive either a cargo tie down stud or a seat stud, the fitting having locking means therein for locking the studs in place and also providing means for easily removing said studs so as to permit ease of changeability with a minimum amount of time in order to convert the aircraft from cargo to passenger and vice versa, the fitting also having means for preventing dust from entering therein when not in use.

These and other objects will become more apparent when read in light of the accompanying drawings and specification wherein similar parts have like numbers and wherein:

Figure 1 is a view showing the inside of an aircraft with cargo tied down in place, and seats shown in phantom.

Figure 2 is a view showing a cargo tie down fitting in position for tying down cargo.

Figure 3 is a plan view showing the keyhole slot in the subject invention.

Figure 4 is a cross sectional view of the subject invention taken on lines 4—4 of Figure 3.

Figure 5 is a cross sectional view of the subject invention showing a cargo tie down fitting being inserted or removed.

Figure 6 is a cross sectional view of the subject invention showing the cargo tie down fitting locked in position.

Figure 7 is a side view showing a slot in the side of the housing.

Referring to Figures 1 through 7, 20 generally represents an aircraft having cargo 22 therein, the said cargo being tied down by straps, chains or cables and fittings 24 attached to the floor 26 of the aircraft and being flush therewith. Passenger seats 28 are also shown in phantom in the aircraft 20 and are held in place by the fittings 24. The floor 26 is provided with depressions 30 to receive plates 32 so as to make the floor and plate flush with each other. The plate 32 is fastened to the floor 30 by screw means 34. The plate 32 is further provided with a keyhole slot 33 therein. A housing 36 is connected to the plate 32 by screw means 38. The bottom portion of the housing is provided with cylindrical guide means 40 which extend through the bottom portion of said housing. The said guide means carry piston rods 42 and 44 having piston heads 46 and 48 respectively thereon. Piston heads 46 and 48 are designed to normally fill the keyhole slot 33 in the plate 32. The piston head 48 is further designed to extend under the piston head 46. The piston heads 46 and 48 and the guide openings 40 provide spring seats for coil springs 50 and 51 which tend to normally maintain the pistons in a position whereby the keyhole slot 32 is completely filled. The piston head 46 is provided with a slot 47 for the insertion of a screwdriver. The piston head 46 is also provided with a pin 52 for engaging a slot 54, the said slot extending longitudinally of said housing for approximately half the length of the housing, then extending circumferentially for a short distance as shown in Figure 7. The end of the slot 54 is provided with a slightly larger opening 56 which is adapted to retain the pin 52 in that position. The cargo tie down 58 is provided with a stud 60 the said stud having a groove 62 with one side of said groove having a diameter 64 sufficiently small to enter the larger portion of the keyhole slot 33 but a diameter greater than the narrow portion of said keyhole slot. Adjacent the other end of said groove 62 the stud 60 is provided with a sufficiently large abutment 65 having a diameter greater than either the narrow portion or larger portion of said keyhole slot 33 to limit the insertion of the stud into the housing. The stud for the seat fitting (not shown) can be made integral with the legs of the passenger seats and grooved in the same manner as the cargo tie down stud.

When not in use the keyhole slot 33 is normally completely filled by the piston heads 46 and 48 to prevent dust from entering the housing 36. To insert a cargo tie down fitting or seat fitting it is only necessary to position them on the piston 46 and push them downward against the spring 50 and then slide them into the narrow portion of the slot, whereupon the piston 46 will snap back into the large portion of the keyhole slot and lock them in position; or insert a screwdriver into the slot 47 in the piston head 46 and force the pistons down against the springs 50 and 51 until the pin 52 engages the circumferential portion of the slot 54 and then turning the piston head 46 so that the pin 52 will seat in the opening 56. In this position the cargo tie down fitting or seat stud can easily be inserted into the large portion of the keyhole slot 33 and then moved into the narrow portion of said slot. The piston head 46 may then be turned back to the longitudinal portion of the slot 54 by releasing the pin 52 and the spring 50 will force the piston head back into its original portion filling the larger portion of the keyhole slot, thereby locking the cargo stud or seat stud in position (Figure 6). In order to remove the cargo stud 60 or seat stud (not shown) a screwdriver or the like is inserted into the slot 47 forcing the piston 46 down against the spring 50 and turning the piston 46 so that the pin 52 will seat in the opening 56. The cargo tie-down fitting or seat fitting can then be moved to the larger portion of said keyhole slot 33 and then removed so that either a seat fitting or cargo tie down fitting can be inserted.

The cargo tie down studs and seat studs have been tested and can be made to withstand large loads to enable them to carry substantially heavy cargo. By virtue of this invention a simple and efficient means is provided for easily changing from cargo carrying to passenger carrying with a minimum amount of effort. It also provides a means for carrying a varying amount of passenger and cargo to meet any varying needs at any airport. As a result of this invention passenger aircraft can carry any type of cargo whenever passenger travel is lower, and the space not used by passengers can be easily utilized. The changeover can be easily made during the period of aircraft stopovers at any airport. Also visual inspection can be made to determine whether the device is in locking position.

This device may be used in connection with restraining seats in commercial vehicles, ambulances and for trailer hitching. It is apparent the specific embodiment shown above has been given by way of illustration and not by way of limitation and that the structures above described are subject to wide variation and modification without departing from the scope or intent of the invention, all of which variations and modifications are to be considered as equivalents and be included within the scope of the present invention.

Whereby I claim:

1. In an aircraft, a cargo tie-down stud or the like in combination with a receiving fitting in the floor of said aircraft, said receiving fitting comprising a plate flush with said floor, a housing connected to the underside of said plate, said housing provided with two slotted guides at one end thereof, said plate provided with an enlarged slot portion and a narrow slot portion connected to said enlarged slot portions, said enlarged and narrow slot portions positioned opposite said slotted guides, a spring-biased piston slidable within each of said two slotted guides, the first of said pistons having a piston head thereon in alignment with said narrow slot portion and biased in an upward direction to close said narrow slotted portion, the second of said pistons having a piston head thereon in alignment with said enlarged slot portion and biased in an upward direction to close said enlarged slot portion, said housing further having a slot at one side thereof including a longitudinal and circumferential portion, a pin projecting from said second piston into said slot, said piston heads engaging one another in downward movement and said pin seated in the circumferential portion of said slot to retain said piston heads in downward positions, and said cargo tie-down stud having an outer shoulder portion, an inner shoulder portion, and a circumferential groove spaced therebetween, said outer shoulder portion of a diameter smaller than said enlarged slot portion and larger than said narrow slot portion for insertion in said enlarged slot portion to force said piston heads downwardly with said groove disposed in said enlarged slot portion, and said groove of a diameter smaller than said narrow slot portion for displacement in a direction normal to the axis of said stud into said narrow slot portion to secure said outer shoulder portion against release from said narrow slot portion, said inner shoulder portion abutting the outer surface of said plate allowing said second piston to return to a position closing said enlarged slot portion upon displacement of said stud into said narrow slotted portion, said stud being releasable by downward displacement of said second piston and rotation thereof to lock said pin in the circumferential portion of said slot whereby said stud is movable into said enlarged slot portion for release therefrom.

2. In an aircraft, means for interchanging cargo tie-down fittings and seat fittings, said means comprising female fittings in the floor of said aircraft and male studs at the ends of said cargo tie-down fittings and said seat fittings, each female fitting having a keyhole slot, each stud being of a diameter smaller than the narrow portion of said keyhole slot and having an outer flange portion of a diameter smaller than the enlarged portion and larger than the narrow portion of said keyhole slot, to engage the narrow portion of said keyhole slot, a spring-biased piston associated with each of said female fittings for normally closing the enlarged portion of said keyhole slot including limit stop means to arrest said piston in its upward movement to close said enlarged slot portion, said piston having locking means for securing said male stud in place within the narrow portion of said keyhole slot, said limit stop means further movable to hold said piston in a down position away from the enlarged portion of said keyhole slot to permit easy interchangeability of the studs.

3. In a coupling, a male member having a flange portion at the end thereof, a female housing provided with a keyhole slot therein, said male member being of a diameter less than that of the small portion of said keyhole slot and said flange of a diameter less than the large portion of said keyhole slot and greater than the small portion of said keyhole slot to lockingly engage with said small portion, spring-biased pistons disposed within said housing to normally close said keyhole slot to keep out dust or the like, one of said spring-biased pistons filling the large portion of said keyhole slot and securing said male member in locking engaging position with said female housing, and the other of said pistons normally filling the smaller portion of said keyhole, means connectable between one of said spring-biased pistons and said female housing to arrest said pistons in an upward position closing said keyhole slot and further connectable for locking said pistons in a down position below said keyhole slot whereby the male fitting may be moved laterally from the smaller to the larger portion of said keyhole slot.

4. A load securing device having a plate with a generally keyhole shaped aperture therein and a support structure connected to said plate, closure mechanism positioned within said support structure comprising a first moving member having a part to fit the enlarged portion of said aperture and a second moving member associated with said first member having a part to fit the remaining portion of said aperture, both of said members being movable into said aperture to close said aperture, and projecting means on at least one of said moving members to depress said second moving member upon depression of said first moving member, means biasing said members to the closed position, and said first member having a limit stop engageable with said support structure to position said first member with its surface flush with the surface of said plate when in closed position.

5. A receiving tie-down fitting positioned within a floor surface or the like in combination with a stud member utilized to attach a member to the floor, said receiving fitting comprising a plate flush with the floor surface, a housing extending below the floor from the bottom surface of said plate, and a piston assembly disposed within said housing, said plate provided with enlarged and narrow connected slot portions, said piston assembly having a head portion thereon for normally closing the enlarged slot portion and resilient means to urge said head portion into a closed position within said enlarged slot portion, said housing and said piston assembly having detent engaging means to arrest the upward movement of said piston assembly with the head portion in the closed position within said enlarged slot portion and further movable to lock said piston assembly in a downward position away from said enlarged slot portion, and said stud having an outer flange portion smaller than said enlarged slot portion for insertion therethrough, an inner flange abutting the plate portion surrounding said enlarged slot portion and formed with a groove portion spaced between said flanges smaller than said narrow slot portion for movement therein to secure said outer flange against outward movement, the head portion of said piston assembly movable upwardly into said enlarged slot portion to retain said stud within said narrow portion.

6. A load securing device having a plate with a generally keyhole-shaped aperture therein and a supporting structure connected to said plate, closure mechanism for said aperture disposed within said supporting structure including a first moving member having a part to fit the enlarged portion of said aperture and having limit stop means engageable with said supporting structure to selectively control the extent of movement of said first moving member and to hold said part of the first moving member within the enlarged portion of said aperture, a second moving member associated with said first moving member having a part to fit the remaining portion of said aperture, both of said members being movable into and out of said aperture, and projecting means on at least one of said moving members to control the movement of said second moving member to correspond with the movement of said first moving member.

7. A load securing device having a plate with a generally keyhole-shaped aperture therein, supporting structure connected to said plate, and a resilient part positioned on one side of said plate in alignment with the enlarged portion of said keyhole-shaped aperture, a stud element being of a diameter less than that of the narrow portion of said keyhole-shaped aperture having an outer shoulder portion smaller than said enlarged portion for insertion therein from the opposite side of said plate, said shoulder portion being larger than said narrow portion to engage said one side of said plate when said stud element is in the narrow portion of said aperture, said resilient part including limit stop means engageable with said supporting structure for holding the end of said resilient part in the enlarged portion of said keyhole-shaped aperture and further including a portion engaging the shoulder portion of said stud element to retain it in said narrow portion, said resilient part movable away from said shoulder portion for removal of said stud element through said aperture.

References Cited in the file of this patent
UNITED STATES PATENTS 2,422,693   McArthur _____ June 24, 1927